United States Patent [19]

Schmid et al.

[11] 4,403,152

[45] Sep. 6, 1983

[54] OPTICAL FIBER POSITION SENSOR

[75] Inventors: Hermann Schmid, Binghamton; Robert C. Wells, Endwell, both of N.Y.

[73] Assignee: General Electric Company, Binghamton, N.Y.

[21] Appl. No.: 264,283

[22] Filed: May 18, 1981

[51] Int. Cl.³ .................................................. G02B 5/16
[52] U.S. Cl. .................................... 250/551; 250/227; 350/96.15
[58] Field of Search ................. 250/227, 551; 356/150, 356/152; 350/96.15, 96.23

[56] References Cited

U.S. PATENT DOCUMENTS

| | | | |
|---|---|---|---|
| 4,056,722 | 11/1977 | Ray | 250/231 SE |
| 4,187,025 | 2/1980 | Harmer | 356/133 |
| 4,190,318 | 2/1980 | Upton, Jr. | 350/96.20 |
| 4,277,134 | 7/1981 | Upton, Jr. | 350/96.20 |

*Primary Examiner*—David C. Nelms
*Assistant Examiner*—J. Jon Brophy
*Attorney, Agent, or Firm*—Arthur E. Bahr; I. David Blumenfeld; Stephen A. Young

[57] ABSTRACT

An optical fiber position sensor includes an optical fiber cable wound in the shape of a single layer, tightly wound coil, the coil being secured to a first member. A second member, which is linearly movable with respect to the first member, has fixed thereto an LED which is aimed at the coil such that radiation being emitted from the LED is injected approximately tangentially into the coil. Radiation being transmitted through the coil is attenuated as a function of the distance that it travels therethrough and as a result, radiation exiting the coil through the terminations is representative of the location of the movable member with respect to the fixed member.

10 Claims, 3 Drawing Figures

U.S. Patent       Sep. 6, 1983       4,403,152
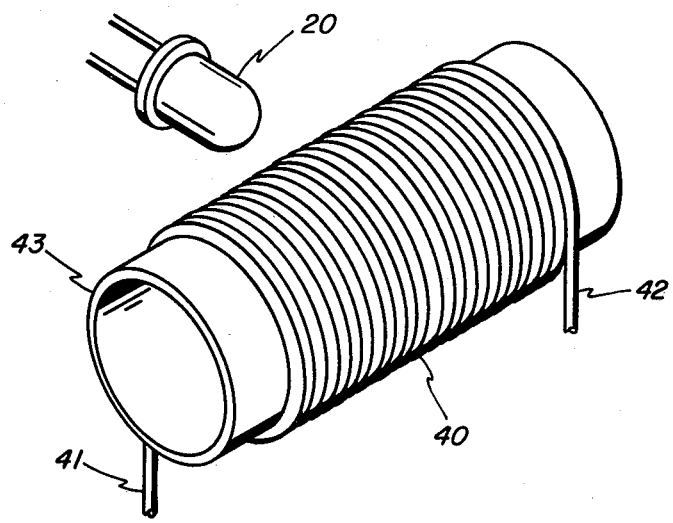
FIG. 2
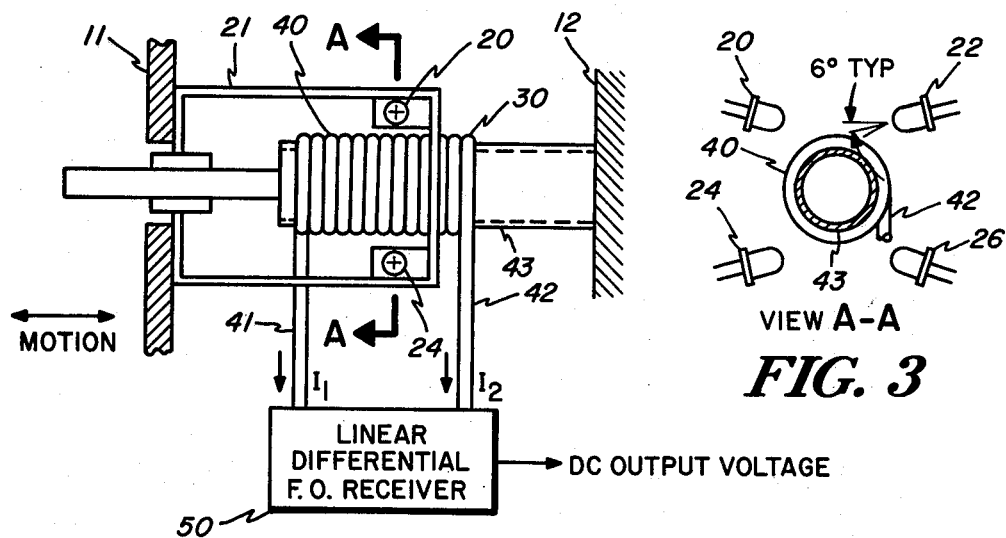
FIG. 1
FIG. 3

OPTICAL FIBER POSITION SENSOR

BACKGROUND OF THE INVENTION

1. Field of the Invention

The present invention relates to a position sensing device, and more particularly, to an optical fiber position sensor for determining the position, or location, at any given time of an element movable with respect to another element fixed relative to the movable element.

2. Description of the Prior Art

In present day flight control systems, the positions of most actuator control surfaces of an aircraft are sensed with an electromagnetic, linearly variable, differential transformer (LVDT). The conventional electromagnetic LVDT is an extremely simple device with high linearity and nearly infinite resolution, and which can operate in rather adverse environments (high and low temperatures, vibration, shock, etc.). However, conventional LVDT's are bulky and heavy, require special frequency excitation, and produce amplitude modulated AC output signals which are cumbersome to convert. Furthermore, a quad-redundant actuator requires a total of 16 LVDT's, a significant volume and weight. Since reduction of component weight and size is given high priority in aircraft design, it is desirable to provide an actuator position sensor which is smaller, lighter in weight, and simpler of construction and operation than the conventional LVDT.

In anticipation of increased use of optical components in flight control systems, including eventually a totally fly-by-light system, actuation position sensors must interface with other optical components. Any resulting sensor must be as simple and reliable as the present day LVDT. Furthermore, if we must continue to use the LVDT with an otherwise wholly optical system, the necessary interfaces with the LVDT would be cost prohibitive and fraught with problems of reliability; in a flight critical system, reliability can not be sacrificed.

It is, therefore, an object of the present invention to provide a position sensor which is simpler, smaller, and lighter in weight than conventional LVDT's and which is, at the same time, capable of performance equal to or better than that available with conventional LVDT's and which is compatible with a fly-by-light system.

SUMMARY OF THE INVENTION

In accordance with the present invention, there is provided apparatus for determining the position of a first element relative to a second element, one of the first and second elements being movable relative to the other. Included is a source of electromagnetic radiation, the source being fixedly secured to the first element. Also included is an optical fiber cable, at least a portion of the cable being fixedly secured to the second element. The cable is arranged to receive radiation from the source for transmission therethrough, the cable being further arranged to effect optical attenuation of the radiation transmitted therethrough. One of the source and at least a portion of the cable is movable with respect to the other as a function of motion of the element to which it is secured relative to the other element, whereby optical attenuation of radiation exiting the cable is proportional to the relative motion.

BRIEF DESCRIPTION OF THE DRAWING

In the accompanying drawing:

FIG. 1 shows the preferred embodiment of the optical fiber position sensor of the present invention;

FIG. 2 shows in more detail, and in perspective, portions of the preferred embodiment of FIG. 1;

FIG. 3 is a sectional view taken along line A—A of FIG. 1.

DESCRIPTION OF THE PREFERRED EMBODIMENT

In accordance with the present invention, and referring now to FIG. 1, there is shown the preferred embodiment of the optical fiber position sensor of the present invention. Such a position sensor is useful for determining the position of a first element, such as first member 11, relative to a second element, such as second member 12, one of the members 11 and 12 being movable with respect to the other. The position sensor includes a source of electromagnetic radiation, such as a light emitting diode (LED) 20, the LED being fixedly secured to one of the members 11 and 12, in the preferred embodiment to first member 11 through a support structure 21. Also included is an optical fiber cable 30, at least a portion of the cable being fixedly secured to the other of the members 11 and 12 (in the preferred embodiment to second member 12), the cable being arranged to receive radiation beamed from LED 20 for transmission through the cable, the cable being further arranged to effect optical attenuation of radiation transmitted therethrough. In the preferred embodiment, the optical fiber cable 30 is formed in the shape of a single layer, tightly wound coil 40 having terminations 41 and 42 outside the coil. Optical fiber coil 40 is wound upon an optically reflective cylinder, coil form 43, which is in turn fixedly secured to second member 12 by any suitable means.

Radiation from LED 20 is arranged for injection approximately tangentially into at least one loop of optical fiber coil 40, as can be seen in FIG. 3. A maximum of radiation was found to be capable of injection into a tightly wound optical fiber coil when the radiation is directed in an approximately tangential manner from the outside of the coil and with a cylindrical reflective surface (such as coil form 43) on the inside diameter of the coil. It is believed that multiple reflections and increased surface exposure to such radiation are instrumental in obtaining maximal injection of radiation.

With such an arrangement, radiation entering the optical fiber cable 30 is attenuated as it is transmitted through the cable as a function of the distance transmitted. With radiation being beamed at the coil 40 from a single LED 20, radiation being transmitted through the coil would exit the coil through termination 42, the intensity of the radiation exiting that termination being a function of the distance which it travels through the coil. It is believed that radiation injected into the coil 40 of optical fiber cable is attenuated as a function of distance travelled for a number reasons. These include:

1. a portion of the radiation entering the optical fiber occurs at an angle greater than the acceptance angle of the fiber and therefore, escapes from the fiber;
2. the tightly wound fiber increases attenuation of radiation entering the fiber due to the small radius of the coil and strains in the fiber; and
3. some of the radiation is injected into and travels along the cladding of the fiber where attenuation is greater than for the core of the fiber.

With the arrangement as shown, first member 11 is linearly movable with respect to second member 12, and LED 20 which is secured to the first member 11 through support structure 21 is therefore linearly movable relative to the coil 40 of optical fiber cable along a line parallel to and equidistant from the longitudinal axis of the coil 40. This linear motion causes the radiation ebeing beamed at the coil 40 from the source 20 (and 22, 24, 26) to move along the coil surface in an axial direction, thus changing the point of entry or injection of the radiation. In the preferred embodiment as shown, is is worthly to note that approximately one half of the total radiation entering the coil 40 is in one direction (e.g. clockwise) and the other half enters in the other direction (e.g. counterclockwise).

Means are included for measuring intensity of radiation exiting termination 42 of optical fiber coil 40 and such may take the form of a radiation meter. If it is desired that radiation exit both terminations 41 and 42, a second LED 22 may be supplied approximately opposite the first LED such that radiation therefrom is likewise beamed approximately tangentially at the coil 40 to travel therethrough in the other direction to exit termination 41 and in which case, a linear differential radiation meter 50 is provided for measuring the intensity of radiation exiting both terminations 41 and 42.

When the radiation sources are central of the coil, radiation exiting both coil terminations will be balanced since the distance travelled within the coil in each direction is approximately equal and attenuation will therefore be in approximately the same amount. For source location between these extremes, radiation exiting the coil terminations will be proportional to the displacement of the source from the position central of the coil. When the radiation sources are located at either coil end, approximately half of the entering radiation will exit the nearest coil termination essentually without attenuation. The remaining radiation must travel the full length of the coil and will be attenuated to the maximum possible extent.

In the preferred embodiment, two additional LED's 24 and 26 are provided aligned approximately 90° apart as shown in FIGS. 1 and 3 so as to provide a greater quantity of radiation to the coil 40. The four LED's are Monsanto ME-7124 with 3 mW typical IR output at a 6 degree beam width. Also, in the preferred embodiment, the coil 40 is formed of a single optical fiber having a diameter of 200 um wound to 50 turns upon a 0.75 inch diameter, 2 in. long coil form cylinder 43. It is, however, within the contemplation of this invention that an optical fiber cable may consist of a strand of multiple fibers.

While a postion determining or sensing device has been described in what is presently considered to be the preferred embodiment of the invention, it will be apparent to those skilled in the art that various changes and modifications may be made in the structure and in the instrumentalities utilized without departing from the invention. As an example, radiation from a source may be directed generally radially towards the coil, rather than tangentially, in order to minimize the number of sources used. The appended claims are intended to include such modifications and changes, and equivalent variations, as coming within the true spirit and scope of the invention.

We claim:

1. Apparatus for determining the position of a first element relative to a second element, one of said first and second elements being linearly movable relative the the other, comprising:

a source of electromagnetic radiation, the source being adapted to be fixedly secured to the first element; and an optical fiber cable formed in the shape of a single layer, generally cylindrical coil having a termination at either end outside the coil, the optical fiber coil being adapted to be fixedly secured to said second element and arranged to receive radiation from said source by injection into at least one loop of the coil;

one of said source and said cable being linearly movable with respect to the other as a function of linear motion of the element to which it is secured relative to the other element; whereby radiation being transmitted within said cable is attenuated proportional to the distance travelled within said cable, the relative intensity of radiation exiting from the respective coil end terminations being representative of the position of one of said source and said cable relative to the other.

2. The invention of claim 1 further comprising means for measuring intensity of radiation exiting from the coil end terminations.

3. The invention of claim 1, wherein the source includes first and second light emitting diodes, the first light emitting diode arranged approximately orthogonal to the longitudinal axis of the coil such that radiation emitted therefrom is beamed approximately tangentially at the coil, the second light emitting diode arranged approximately orthogonal to the longitudinal axis of the coil and opposite the first light emitting diode such that radiation therefrom is beamed approximately tangentially at the coil at the same loop thereof as is radiation from the first light emitting diode thereby to provide radiation exiting the coil from each termination of the coil.

4. The invention of claim 1 wherein the optical fiber coil is wound upon an optically reflective cylinder.

5. The invention of claim 3 wherein the means for measuring intensity includes a linear differential radiation meter receiving radiation from the terminations of the optical fiber coil.

6. The invention of claim 5 wherein the radiation meter is of the photo-voltaic cell type.

7. The invention of claim 1 wherein the optical fiber cable consists of a single fiber.

8. The invention of claim 1 wherein the optical fiber cable consists of a strand of multiple fibers.

9. The invention of claim 1 wherein the source is movable with respect to the cable along a line parallel to and equidistant from the longitudinal axis of the coil of optical fiber cable.

10. The invention of claim 1 wherein adjacent loops of the coil are tightly spaced relative to one another.

* * * * *